June 29, 1971     G. WALLIS ETAL     3,589,965
BONDING AN INSULATOR TO AN INSULATOR
Filed Nov. 27, 1968
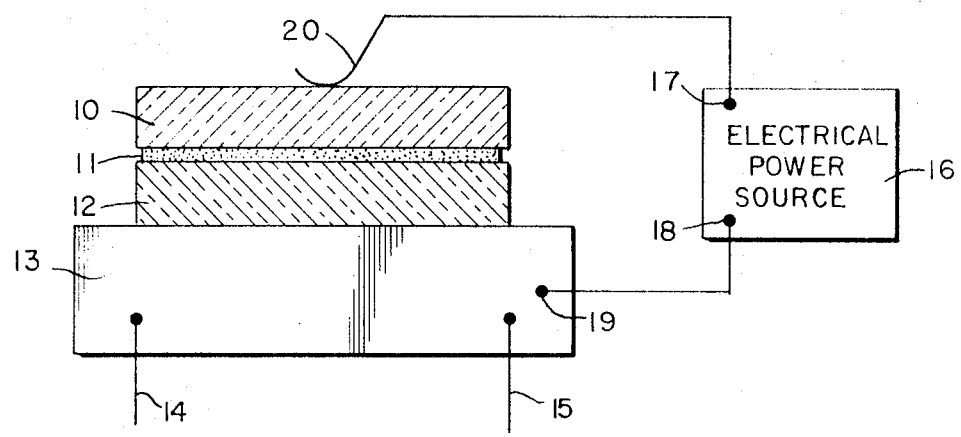
INVENTORS
SUMNER P. WOLSKY
GEORGE WALLIS
DANIEL I. POMERANTZ
JOHN J. DORSEY

United States Patent Office 3,589,965
Patented June 29, 1971

3,589,965
BONDING AN INSULATOR TO AN INSULATOR
George Wallis and Daniel I. Pomerantz, Lexington, John J. Dorsey, Waltham, and Sumner P. Wolsky, Lexington, Mass., assignors to P. R. Mallory & Co. Inc., Indianapolis, Ind.
Filed Nov. 27, 1968, Ser. No. 779,539
Int. Cl. B29c 27/00, 27/30
U.S. Cl. 156—272          8 Claims

ABSTRACT OF THE DISCLOSURE

An inorganic electrical insulator material is bonded to another inorganic insulator material by forming a metallic film on a surface of one of the materials, placing the metallized film surface in close contact with the other material and applying an electrical potential across the materials producing a low current through the composite, the insulator materials being heated to increase their electrical conductivity.

---

The present invention is directed to bonding an insulator to an insulator and, more particularly, to bonding an insulator to an insulator utilizing an intermediate metallic film preformed on the surface of one of the insulators.

In the past, some insulators have been joined in various ways such as by application of temperature or pressure or a combination thereof. Also, glasses have been joined by fusion techniques to other glasses and various oxides such as SiO and $SiO_2$. One of the problems involved in bonding insulators by application of heat is that considerable stresses are built up by the bonding process. This is especially true with insulators such as glasses. Another problem has been that dimensional tolerances are hard to hold because of the molten phase resulting from the application of heat.

Another contemporary technique for joining some insulators has been to metallize the surfaces of the insulators and to join the metallized surfaces by brazing or soldering techniques. This particular approach has, inter alia, the obvious disadvantage of metallizing both surfaces as well as in some cases utilizing undesirable elevated temperatures necessary for brazing or soldering techniques.

A further technique for joining some insulators has been to place the surfaces of the insulators to be joined in close contact, heating the insulators to an elevated temperature and applying an electric potential across the surfaces. This particular approach has, inter alia, the disadvantage of being limited to joining only certain types of insulators as well as utilizing relatively high temperatures.

Accordingly, it is an object of the invention to provide a novel method for bonding a variety of insulators by means of an intermediary metallic layer therebetween.

Other objects of the invention and the nature thereof will become apparent from the following description considered in conjunction with the accompanying drawing which is a side view in section of a simplified system for bonding an insulator to another insulator through the medium of an intermediary metallic layer.

The present invention obviates various problems heretofore encountered in the prior art including those specifically noted above. It provides an improved and effective method of bonding one inorganic insulator to another inorganic insulator wherein, for example, one of the insulators is first metallized with a metallic film and the metallized film surface is placed in contact with the other insulator and a potential is applied across the unit or composite, the insulators being heated to increase their electrical conductivity, and a small current passes through the unit. In the method the current may be of low value and the insulators are heated to a temperature below the respective softening points of the metallized film and insulators, the conditions being such that neither insulator nor the metallized film is rendered molten.

The present invention exhibits many and various advantages, for example, an insulator of one particular type may be bonded to another type even though their physical properties may vary considerably as well as enabling them to be bonded at lower temperatures than are usually required in the prior art including those specifically noted above.

In general, the metallic film or layer should exhibit uniformity of thickness and composition and good adhesion to the insulator substrate. Film or layer thickness can be varied and the metal films or layers should be dense and coherent but the thickness should not be such that its thermal expansion characteristics produce undue stresses in the bond. Generally, film or layer thickness of less than about 5 mils are preferred and film thickness of from about 1,000 A. to about 5,000 A. are especially preferred.

The metallic film can be deposited on the surface of the insulator by many and various methods. Suitable methods for depositing metallic films include vacuum evaporation, sputtering, gas plating, electroless plating, silk screening and the like depending upon, inter alia, the particular metals and insulators used.

Vacuum evaporation can be carried out in a highly evacuated glass (or metal) bell jar containing a filament, such as tungsten, which is heated to a high temperature by electric current. The metallic material is heated sufficiently by being in contact with the filament to quickly vaporize. Since the jar is under vacuum (usually $10^{-6}$ to $10^{-5}$ torr), the evaporated material radiates in all directions from the source and deposits upon substrate which is usually heated during evaporation to promote adhesion. An example of a metal which can be deposited by this method includes aluminum.

Sputtering can be carried out using an apparatus similar to that for evaporation. A low vacuum (usually $10^{-4}$ to 0.1 torr) is maintained by bleeding a gas, such as argon, into the bell jar. A glow discharge is initiated by applying a high voltage between the source (cathode) and anode. Gas ions, such as argon ions, produced by the discharge are accelerated toward the cathode and because of their sufficient energy knock atoms or molecules out of the cathode with sufficient velocity to adhere to the substrate which is positioned either in the glow region or on the anode. Examples of metals which can be deposited by sputtering include the refractory metals, such as tantalum.

Gas plating or vapor phase deposition involves reducing or decomposing a volatile metal halide, such as aluminum chloride so that a film of metal is deposited on a heated substrate. The source compound should be capable of being readily broken up into its component atoms by dissociation or reduction at temperatures below the melting point of the film or substrate, but it must be stable enough to reach the deposition surface before decomposition takes place.

Electroless plating involves reducing a metal ion in solution to the base metal by a reducing agent and such is deposited as a metallic film without the use of an electric current. Examples of metals which can be electroless plated include nickel, cobalt, iron, and chromium.

Referring now to the drawing disclosing in diagrammatic form one simple application of the invention there is shown a composite comprising an insulator 10, an intermediate metallic layer 11 deposited upon another insulator 12. The thickness of the elements 10 and 12 may vary considerably. The limit as to thinness is the only one which requires particular consideration it being governed by the capability of handling preparatory to bonding. The insulators are heated to render them more electrically conductive and in the practice of the invention the temperature will vary dependent upon the type or specific composition of the metallic film or layer and insulator materials, but in general will be in the range of 150° C. to 1200° C. When an insulator is a borosilicate glass, such as the type obtainable from the Corning Glass Works under the trademark "Pyrex," the preferred range is about 300° C. to 700° C. For the soft glasses, the temperature will be in the range of about 150° C. to 600° C., and for quartz glass the temperature will be in the high range of about 600° C. to about 1200° C. In every case the upper limit will be below the softening point of the particular glass. The heating of the insulators may be effected in any suitable way such as through the medium of a platen 13 upon which the unit is supported, the platen comprising a conductive element embodying an electrical resistance heater connected to an electrical source through the terminals 14 and 15. Other means may be employed, however, such as by electrical induction or inserting the unit in a furnace or oven heated in any suitable manner.

As indicated in the drawing an electrical potential is applied across the composite unit this being accomplished through a power source 16 having a terminal 18 connected at 19 to the metal platen 13 and the opposite terminal 17 of the power source being connected through a terminal 20 to the upper insulator 10. The terminal 20 may be in direct contact with the insulator element 10 or if desired it may be spaced a small distance therefrom in the order of about 0.1 mm. whereby a high field develops between the terminal 20 and the member 10 which ionizes the air so that current passes. The electrical power preferably in most cases is a direct current source, but may be a pulsating direct current source, or in some cases an alternating current power source, particularly of a low frequency.

The type of power source and in the case of direct current, the polarity as applied to the unit may depend in some cases upon the type of insulators being used and particularly whether the insulator has a symmetrical potential distribution characteristic or an asymmetrical potential distribution characteristic.

Potential distribution characteristics for insulators and methods for determining them are well known in the art and fully documented in the literature. The borosilicate glasses in general and particularly Pyrex No. 7740 are asymmetrical in character and for optimum bonding where the insulator 10, for example, is Pyrex, the contact 20 should be made negative. Where the insulator 10 has a symmetrical distribution characteristic the polarity may be in either direction.

Although the exact phenomenon which occurs in the bonding operation is not readily determinable, it is believed to be due principally to an electrostatic force which is generated at the interface between the elements when a potential is applied across the assembled unit. When elements are brought together, even though they may have very smooth and complemental surfaces, there is initially intimate contact at only spaced points with intervening gaps. Then when the potential is applied across the unit and electric current flow ensues, electrostatic attractive forces draw the materials together, usually progressively, closing the gaps. The heating of the insulators increases their electrical conductivity and promotes the generation of the electrostatic forces and the bonding.

The applied voltage, the current density and the time are not critical and may vary within wide ranges. In general, the potential will be in the range from about 200 volts up to perhaps 5000 volts or more. No very definite value for the current density can be stated particularly since, if the applied potential is maintained constant, the current density gradually decreases from, for example, a value in the range of 100 to 300 or more microamperes/cm.$^2$ to a very small value as the bond progresses. In general, a finite current of low value serves the purpose. In general, the higher the potential and corresponding current the lesser the time required and conversely. As a practical matter, the current commonly will be in the range 3 to 20 microamperes/mm.$^2$ and the time in the range minutes, usually less than about 20 minutes.

The following are representative examples of bonding and inorganic insulator to another inorganic insulator in accordance with the invention reference being made to the drawing as illustrating diagrammatically the physical set-up.

In one example in accordance therewith, the insulators 10 and 12 are both borosilicate glasses, one of which is metallized by the vacuum evaporation thereon as previously described of a chromium film. Each glass is about 32 mils thick and the film is deposited to a thickness of about 4,000 A. The composite is heated to a temperature of about 500° C. and a voltage of about 1,000 volts is impressed across the composite. A bond is effected in about 3 minutes. Other metallic films which can be used include nickel-chromium alloy, nickel, chromium, iron, boron, silicon cobalt and aluminum.

In another example, both elements 10 and 12 are a partially crystallized glass with a low temperature coefficient of thermal expansion, commercially available under the name of CerVit, each having a thickness of about 1½ inches. The metallic film is vacuum evaporated aluminum on one of the elements as previously described. Typically the bonding temperature is in the range of from about 250° C. to about 500° C., the voltage in the range of from about 500 to about 3,000 volts, and the bonding time in the order of about 5 minutes. The bonds exhibit a strength under tensile stress in excess of about 2,000 p.s.i. with fracture occurring in the glass.

In still another example, which is directed to a "graded seal," that is, an assembly in which a material with a thermal expansion coefficient $\alpha_1$ is joined to a material having a different coefficient of thermal expansion $\alpha_3$ by means of an intermediate material with a thermal expansion coefficient $\alpha_2$. In one type of graded seal $\alpha_2$ is intermediate in magnitude between $\alpha_1$ and $\alpha_3$. In another type of graded seal the thermal mismatch between $\alpha_1$, and $\alpha_3$ is accommodated by the malleable physical characteristics of $\alpha_2$. In this example, element 10 is a borosilicate glass (Corning 7740) and element 12 is sapphire which is metallized by sputtering thereon a silicon film of about 5,000 A. The composite is heated to a temperature of about 500° C. and a voltage of about 800 volts is impressed across the composite. A bond is effected in about 5 minutes. In another example, element 10 is a partially crystallized glass (CerVit) and element 12 is a borosilicate glass (Pyrex) with an aluminum foil about 2 mils thick therebetween. The composite is heated to a temperature of about 500° C. and a voltage of about 1,000 volts to join the aluminum and Pyrex and a temperature of about 250° C. and a voltage of about 3,400 volts to join the aluminum and CerVit to form the bonded composite.

It will be understood that the particular examples heretofore given are illustrative and many variations therefrom may be employed. Specific examples of borosilicate glasses and crystallized glasses have been mentioned. Other inorganic insulators can beemployed such as quartz and ceramics. Moreover, a particular type of insulator, such as quartz, can be bonded to another type of insulator, such as glass, in order to achieve a graded seal by using the process of the present invention. Additionally, metallic films, other than those previously mentioned, can be used and such include tantalum, titanium, palladium, platinum and the like.

We claim:
1. A method for bonding a first insulator to a second insulator comprising:
   forming a metallic layer having a thickness of less than about 5 mils on a surface of said first insulator, juxtaposing said metallic layer surface and said second insulator in close surface contact, heating said insulators to a temperature of from about 150° C. to about 1200° C. but below the softening points of said insulators and said metallized layer, and applying an electric potential of from about 200 volts to about 5,000 volts across said insulators to produce an electrostatic force thereby effecting a bond between said insulators.

2. A method according to claim 1, wherein said metallic layer is a metal selected from the class consisting of aluminum, copper, nickel, chromium, iron, boron, cobalt, tantalum, palladium and platinum.

3. A method according to claim 2, wherein said insulators are selected from the class consisting of glasses, quartz and ceramics.

4. A method according to claim 3, wherein said first insulator is a different insulator material than said second insulator.

5. A method according to claim 7, wherein said insulators are glasses.

6. A method according to claim 5, wherein said insulators are borosilicate glasses.

7. A method according to claim 5, wherein said insulators are partially crystallized glass.

8. A method according to claim 7, wherein said metallic layer is aluminum of a thickness of from about 1,000 A. to about 5,000 A., said temperature is from about 250° C. to about 500° C. and said electric potential is from about 500 volts to about 3,000 volts.

References Cited
UNITED STATES PATENTS

| 3,397,278 | 8/1968 | Pomerantz | 156—272X |
| 3,417,459 | 12/1968 | Pomerantz et al. | 156—272X |
| 3,457,138 | 7/1969 | Miller | 117—1246X |
| 3,472,665 | 10/1969 | Prueter et al. | 117—1246X |
| 3,506,424 | 4/1970 | Pomerantz et al. | 156—273X |

CARL D. QUARFORTH, Primary Examiner

E. E. LEHMANN, Assistant Examiner

U.S. Cl. X.R.

204—16